US012530277B2

(12) United States Patent
Guo (10) Patent No.: US 12,530,277 B2
(45) Date of Patent: Jan. 20, 2026

(54) AUTOMATIC CODE MODIFICATION FOR HETEROGENEOUS RUNTIME ENVIRONMENTS

(71) Applicant: SAP SE, Walldorf (DE)

(72) Inventor: Feng Guo, Tianjin (CN)

(73) Assignee: SAP SE, Walldorf (DE)

( * ) Notice: Subject to any disclaimer, the term of this patent is extended or adjusted under 35 U.S.C. 154(b) by 190 days.

(21) Appl. No.: 18/484,168

(22) Filed: Oct. 10, 2023

(65) Prior Publication Data

US 2025/0117310 A1 Apr. 10, 2025

(51) Int. Cl.
*G06F 11/362* (2025.01)

(52) U.S. Cl.
CPC ................ *G06F 11/3644* (2013.01)

(58) Field of Classification Search
None
See application file for complete search history.

(56) References Cited

U.S. PATENT DOCUMENTS

| | | | | |
|---|---|---|---|---|
| 11,119,889 B1* | 9/2021 | Yoshida | ............. | G06F 11/3604 |
| 11,720,347 B1* | 8/2023 | Ciliberti | ............. | G06F 8/72 |
| | | | | 717/124 |
| 2017/0300691 A1* | 10/2017 | Upchurch | ............. | G06F 21/12 |
| 2019/0163609 A1* | 5/2019 | Rabasco | ............. | G06F 11/3672 |
| 2020/0097389 A1* | 3/2020 | Smith | ............. | G06F 11/366 |
| 2021/0357307 A1* | 11/2021 | Deng | ............. | G06N 3/088 |
| 2022/0334812 A1* | 10/2022 | Wei | ............. | G06F 11/3604 |
| 2022/0398075 A1* | 12/2022 | Vyas | ............. | G06F 11/3688 |
| 2024/0134614 A1* | 4/2024 | Bakshi | ............. | G06F 8/65 |
| 2024/0289208 A1* | 8/2024 | Cao | ............. | G06F 11/079 |
| 2024/0311922 A1* | 9/2024 | Fields | ............. | G09B 5/06 |

OTHER PUBLICATIONS

J. Bourgeois, V. Sunderam, J. Slawinski and B. Cornea, "Extending Executability of Applications on Varied Target Platforms," 2011 IEEE International Conference on High Performance Computing and Communications, Banff, AB, Canada, 2011, pp. 253-260, doi: 10.1109/HPCC.2011.41. (Year: 2011).*

* cited by examiner

*Primary Examiner* — Andrew M. Lyons
(74) *Attorney, Agent, or Firm* — Buckley, Maschoff & Talwalker LLC (57) ABSTRACT

A system and method include determination of an error in source program code associated with a source runtime environment, determination of a source code statement of the source program code associated with the error, determination of a similarity between the source code statement and each of a plurality of code statements associated with the source runtime environment, determination, based on the determined similarities, of one of the plurality of code statements which is similar to the source code statement, determination of a first name of a first code portion of the source program code which includes the determined one of the plurality of code statements, determination of a second code portion of program code associated with a target runtime environment and having the first name, and determination of a resolution to the error based on the first code portion and the second code portion.

15 Claims, 9 Drawing Sheets

| Runtime Environment | BASIS 757 | BASIS 700 |
|---|---|---|
| Syntax | ```
SELECT DISTINCT bukrs,
                belnr,
                gjahr,
                augbl,
                auggj
       FROM bseg
  INTO CORRESPONDING FIELDS OF TABLE @rt_result
  WHERE bukrs = @is_doc_key-bukrs
    AND augbl = @is_doc_key-belnr
    AND auggj = @is_doc_key-gjahr
  ORDER BY bukrs, belnr, gjahr.
``` | ```
SELECT bukrs
       belnr
       gjahr
       augbl
       auggj
  FROM bseg
  INTO CORRESPONDING FIELDS
    OF TABLE rt_result
   WHERE bukrs =
         is_doc_key-bukrs
     AND augbl =
         is_doc_key-belnr
     AND auggj =
         is_doc_key-gjahr.
SORT rt_result.
DELETE ADJACENT DUPLICATES FROM
  rt_result COMPARING ALL FIELDS.
``` |

*FIG. 3*

| Component | CORE 107 | APPL 602 |
|---|---|---|
| Syntax | ```
SELECT bukrs,
       belnr,
       gjahr,
       buzei,
       augdt,
       augcp,
       augbl,
       auggj,
       bschl,
       koart,
       shkzg,
       mwskz,
       wrbtr,
       hkont,
       rebzg,
       rebzj,
       rebzz,
       rebzt,
       vbeln,
       vbel2,
       posn2,
  FROM bseg_add
  APPENDING CORRESPONDING FIELDS OF TABLE @et_item
  FOR ALL ENTRIES IN @lt_doc_key
  WHERE bukrs = @lt_doc_key-bukrs
    AND belnr = @lt_doc_key-belnr
    AND gjahr = @lt_doc_key-gjahr
  ORDER BY PRIMARY KEY.
``` | ```
SELECT bukrs
       belnr
       gjahr
       buzei
     * augdt
     * augcp
     * augbl
     * auggj
       bschl
       koart
       shkzg
       mwskz
       wrbtr
       hkont
     * rebzg
     * rebzj
     * rebzz
     * rebzt
     * vbeln
     * vbel2
     * posn2
  FROM bseg_add
  APPENDING CORRESPONDING FIELDS OF
  TABLE et_item
  FOR ALL ENTRIES IN lt_doc_key
  WHERE bukrs = lt_doc_key-bukrs
    AND belnr = lt_doc_key-belnr
    AND gjahr = lt_doc_key-gjahr
  ORDER BY PRIMARY KEY.
``` |

FIG. 4

| Component | BASIS 757 | BASIS 700 |
|---|---|---|
| Syntax | rv_result = cl_uuid_factory=>create_system_uuid( )->create_uuid_x16( ). | CALL FUNCTION 'GUID_CREATE' IMPORTING ev_guid_16 = rv_result. |

| Table Name | CODE_RESOLUTION_CATEGORY | | |
|---|---|---|---|
| Description | Errors which can be Resolved | | |
| Field Name | Key | Type | Field Description |
| VERSION_FROM | X | CHAR/30 | The source runtime environment |
| VERSION_TO | X | CHAR/30 | The target runtime environment |
| ERROR_CLASS | X | CHAR/20 | Compiler error message class |
| ERROR_NUMBER | X | CHAR/3 | Compiler error number |
| RESOLUTION_RULE_NUMBER | | CHAR/10 | Resolution Rule identifier |

*FIG. 7*

| Table Name | CODE_RESOLUTION_RULES | | |
|---|---|---|---|
| Description | Resolution Rules | | |
| Field Name | Key | Type | Field Description |
| RESOLUTION_RULE_NUMBER | X | CHAR/10 | Resolution Rule identifier |
| RULE_EXECUTOR | | CHAR/30 | Resolution Executor |

AUTOMATIC CODE MODIFICATION FOR HETEROGENEOUS RUNTIME ENVIRONMENTS

BACKGROUND

The computing landscape of a modern organization typically consists of several database systems. These systems may include one or more development systems on which the organization installs, configures, and customizes a database system, one or more test systems which are used to test the thusly-configured and customized database system, and a productive system which executes the configured and customized database system to receive customer requests and conduct customer transactions. These systems may be implemented, for example, as separate tenants on a single database system, or as separate single-tenant database systems.

A runtime environment consists of an infrastructure in which program code is executed. The infrastructure includes hardware such as a CPU, memory, I/O interfaces, and software such as an operating system, device drivers and libraries. Software providers typically release different versions of a given software application, where each version is suitable for execution within a different runtime environment. Software providers also release new software versions from time to time which include new features and bug fixes. A software provider may agree (e.g., via a service contract) to ensure that, within each supported runtime environment, its software operates satisfactorily and includes all currently-available features.

Due to the foregoing factors, it is difficult to manage the software versions executed by every runtime environment deployed within each customer organization. For example, it is difficult to ensure that the software executed by each runtime environment is up-to-date with current patches and features, particularly as the number of organization landscapes and number of unique runtime environments grow. Moreover, manual code review and code adjustment are needed to ensure that a feature developed in a specific runtime environment will execute smoothly in another runtime environment. Such review and adjustment require legacy coding knowledge and significant organizational resources.

Tools are available for copying binary code among different runtime environments. While such tools may facilitate the updating of software of various runtime environments, they do not address code modifications required to ensure that the updated software executes properly within heterogeneous runtime environments.

DETAILED DESCRIPTION

The following description is provided to enable any person in the art to make and use the described embodiments. Various modifications, however, will be readily-apparent to those in the art.

Some embodiments facilitate the modification of first code suited for execution within a first runtime environment to second code suited for execution within a second runtime environment. According to some embodiments, static code checks are performed in the second runtime environment to identify errors in the first code. Using a knowledge base, an error category may be identified based on the error and an automatic resolution of the error may be determined based on the error category. The automatic resolution may then be executed to modify the first code.

If the category of an error cannot be determined or an automatic resolution of the error is not available, a code statement associated with the error is identified. First code portions similar to the code statement and associated with the first runtime environment are identified, and second code portions associated with the first code portions and the second runtime environment are determined. A proposed resolution of the error is presented based on the first code portions and the second code portions.

Figure 1:
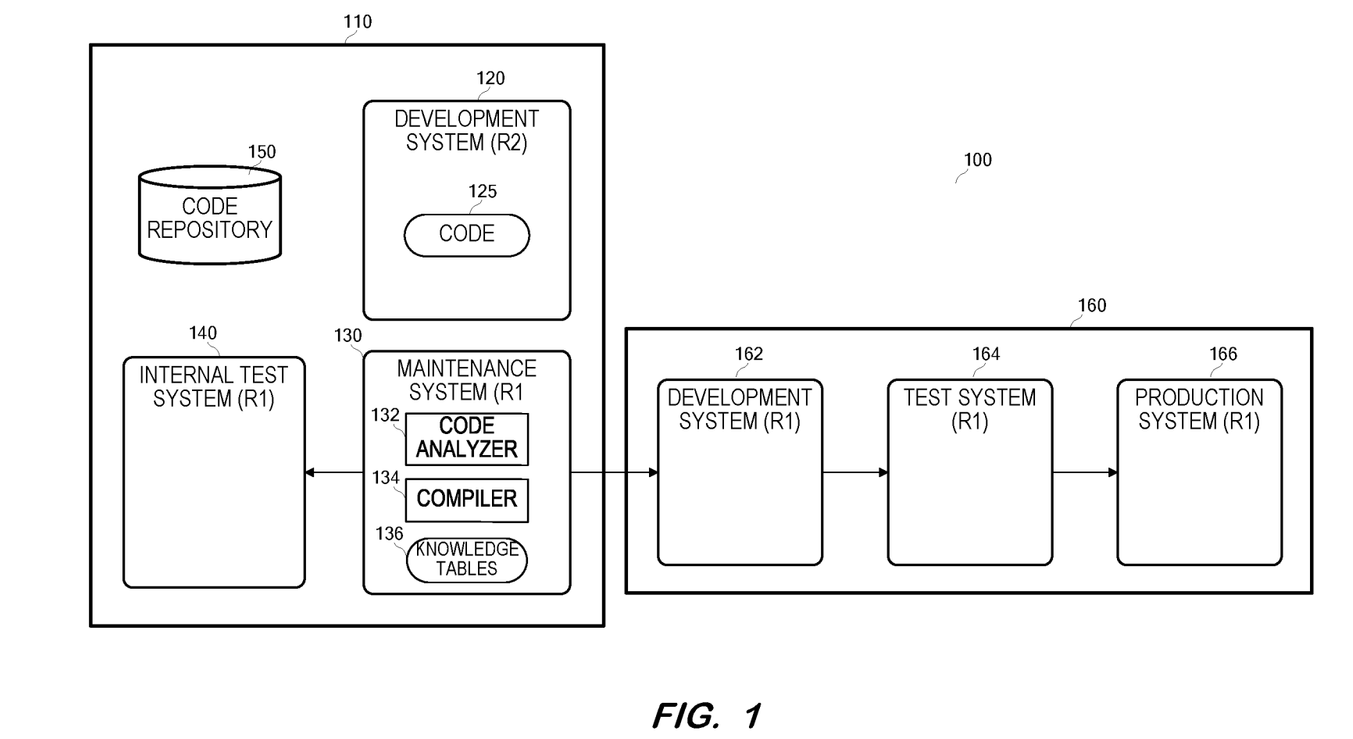
FIG. 1 illustrates a landscape including various systems according to some embodiments.

FIG. 1 illustrates an architecture according to some embodiments. Each of the illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Landscape 100 includes provider systems 110 and customer systems 160. Each system of landscape 100 may comprise a separate system and any two or more systems may be implemented by a single multi-tenant system. The systems may be implemented using any technology that is or becomes known. In some examples, the systems of landscape 100 may be on-premise, cloud-based, distributed (e.g., with distributed storage and/or compute nodes) and/or deployed in any other suitable manner. Each system may comprise disparate cloud-based services, a single computer server, a cluster of servers, and any other combination that is or becomes known. All or a part of each system may utilize Infrastructure-as-a-Service (IaaS), Platform-as-a-Service (PaaS) and/or Software-as-a-Service (SaaS) offerings owned and managed by one or more different entities as is known in the art.

Landscape 100 may include more or fewer systems of each type, other types of systems, and any other components as are known in the art, including but not limited to services, applications, data stores, proxies, redundancies, and availability zones.

Provider systems 110 may be operated, in some embodiments, by an organization or on behalf of an organization to provide functionality to the organization and/or its customers. Provider systems 110 support the deployment of software, or executable code, for productive use. Embodiments are not limited to usage in such deployment systems.

Development system 120 is operated to develop versions of code 125 according to a development cycle. Code 125 is compatible for execution within runtime environment R2 of development system 120. Code 125 may comprise an application, a microservice, or a database system, for example, in a programming language-level format. The programming language may comprise any programming language that is or becomes known, including but not limited to JavaScript, C++, and ABAP.

Runtime environment R2 may comprise any runtime environment that is or becomes known and may be defined by any combination of specific hardware and/or software. For example, runtime environment R2 may comprise a particular version of an operating system (e.g., Windows Server 2022), a particular type of CPU (e.g., Intel 64), and a particular set of software libraries (e.g., Intel oneAPI).

Some runtime environments may be independent of the operating system and reside within a layer between the application and the operating system. Such a runtime environment allows applications to operate independently of the operating system by providing functions including reading and writing files, managing input and output devices, searching and sorting files, and transporting data via networks. Examples of these latter runtime environments include but are not limited to Jave Runtime Environment, Common Language Runtime and Adobe Flash Player.

Traditionally, a maintenance system providing runtime environment R2 would be created within systems 110 to distribute code 125 to customers. Code 125 would be tested using an internal test system providing a same runtime environment (i.e., R2) and then copied from the maintenance system to a customer's development system which also provides the same runtime environment (i.e., R2). Also copied may be pre-configured data within templates provided by the code provider. Regardless of the pre-configured data, the customer is typically required to define certain configuration data and master data in order to align the code with the needs of the organization. Once the configuration data and master data have been defined, the code and data are copied to a test system for testing. Successfully-tested code and data are then copied to a production system for productive use. The test system and the productive system each provide the same runtime environment (i.e., R2).

In the present example, each of systems 162 through 166 implements a runtime environment (i.e., R1) different from the runtime environment of system 120 (i.e., R2). Runtime environment R1 may differ from runtime environment R2 in any one or more ways that are known. Runtime environment R2, for example, may be an updated version of runtime environment R1. Since code 125 is compatible with runtime environment R2, code 125 may require modification (e.g., "downporting") in order to properly run within runtime environment R1 of systems 160.

According to some embodiments, maintenance system 130 is generated to provide a same runtime environment as systems 160. Maintenance system 130 includes processor-executable program code of code analyzer 132 and compiler 134. Compiler 134 is suitable for compiling code conforming to the programming language of code 125 for execution within runtime environment R1. According to some embodiments, code analyzer 132 is executed to receive code 125 and to execute static code checks thereon. The static code checks may be performed by compiling code 125 using compiler 134 and retrieving any errors which result from the compilation.

Knowledge tables 136 of maintenance system 130 include data as will be described below. For each error, code analyzer 132 uses the data of knowledge tables 136 to identify an error category and determine whether an automatic resolution of the error exists. If so, code analyzer 132 executes an executor implementing the automatic resolution to modify code 125.

If the category of an error cannot be determined or an automatic resolution of the error is not available, code analyzer 132 identifies a code statement of code 125 which is associated with the error based on the output of compiler 134. Next, code analyzer 132 accesses code repository 150 to identify code portions similar to the code statement and associated with runtime environment R2. Code repository 150 may comprise any one or more private or public repositories used for code development and version control.

Classes or other master program names associated with the identified code statements and runtime environment R2 are determined from code repository 150. First code portions associated with the master program names and runtime environment R2 are then determined from code repository 150. The master program names are used to identify second code portions of repository 150 which are associated with runtime environment R1. A proposed resolution of the error is then determined based on the first code portions and the second code portions.

Code 125 may be modified manually and/or automatically based on the proposed resolution. The thusly-modified code may be tested using internal test system 140 as described above. Once tested, the modified code is copied to development system 162 and configured/customized as described above. The configured/customized code is then tested on test system 164 and deployed to production system 166 as is known in the art.

Figure 2:
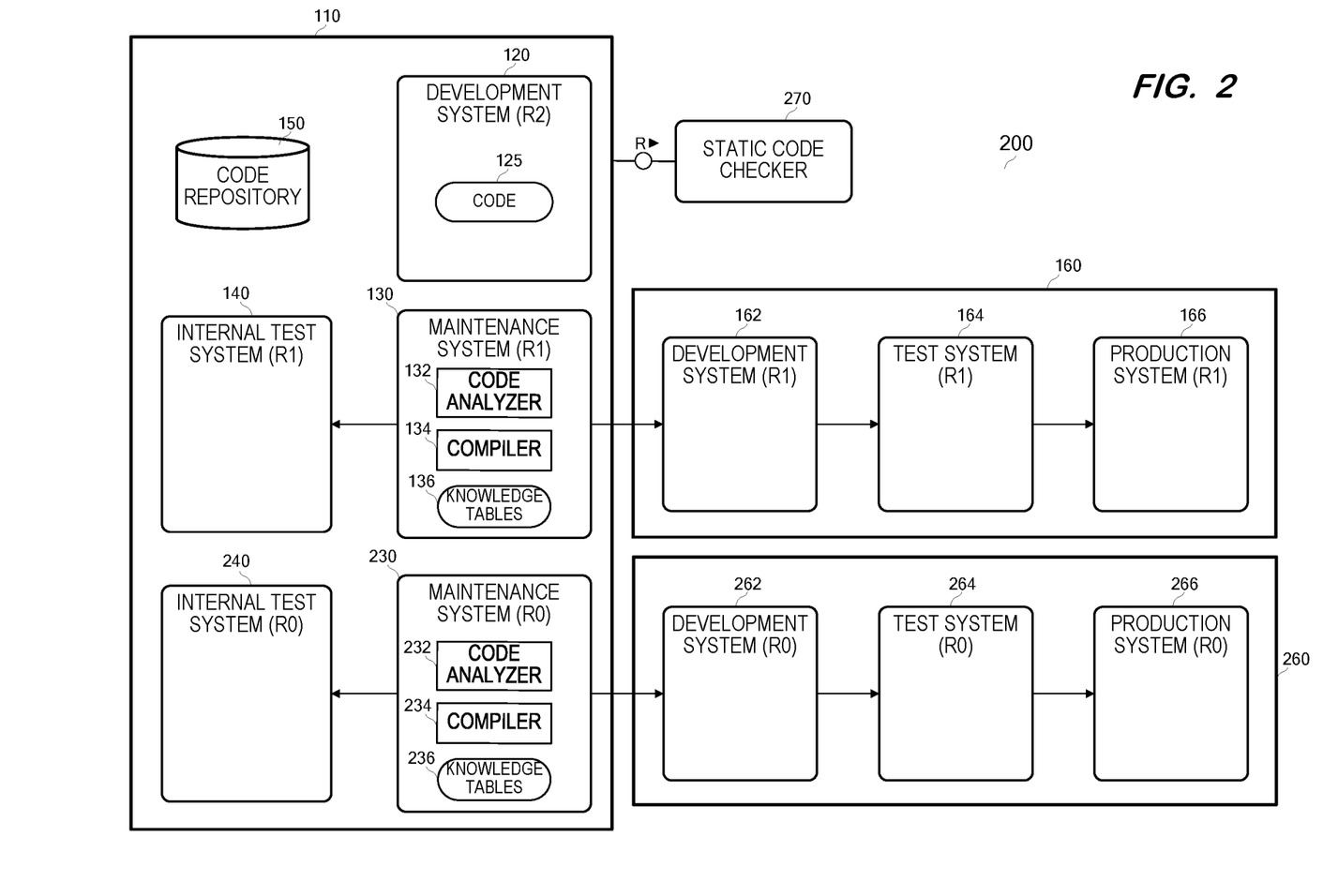
FIG. 2 illustrates a landscape including various systems according to some embodiments.

FIG. 2 illustrates landscape 200 including various systems according to some embodiments. Components 110-166 may be implemented as described above with respect to landscape 100. Systems 260 may be operated by the same customer who operates systems 160 or by a different customer. As shown, each of systems 262, 264 and 266 provides a third runtime environment R0. Runtime environment R0 differs from runtime environments R2 and R1 in any known manner.

Maintenance system 230 includes components 232, 234 and 236 which operate as described above with respect to maintenance system 130 to modify code 125 for execution in runtime environment R0. Since maintenance systems 130 and 230 implement different runtime environments, the errors identified by maintenance system 230 may differ from the errors identified by maintenance system 130. In particular, some statements of code 125 which cause an error in system 130 might not cause an error in system 230, while some statements of code 125 which cause an error in system 230 might not cause an error in system 130. Some statements of code 125 may cause different errors in systems 130 and 230. Resolutions to a same error may be identical or different in systems 130 and 230, and resolutions to different errors may be the same in systems 130 and 230.

Maintenance system 230 may perform static code checks using a compiler as described above and/or external rule-based static code checker 270. Code checker 270 may include standard and customizable rules which are associated with the programming language of code 125. Code checker 270 may expose an API which is called by maintenance system 230 to request a static code check.

Internal test system 240 may test the code after modification for execution in environment R0. The modified and tested code may then be copied from maintenance system 230 to development system 262, configured/customized, tested on test system 264 and deployed to production system 266.

Figure 3:
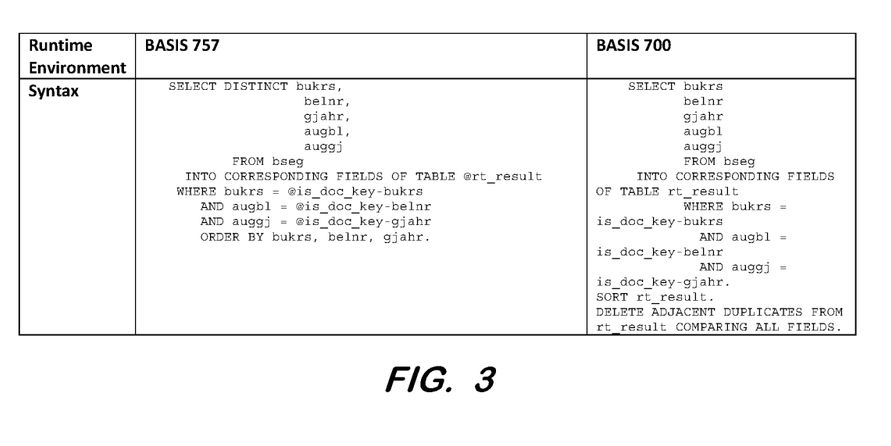
FIG. 3 illustrates cross-environment code modification according to some embodiments.

FIGS. 3-6 illustrate types of incompatibilities which may exist when attempting to execute code associated with a first runtime environment in a second runtime environment, and possible resolutions thereof. As shown in FIG. 3, syntax (e.g., SELECT DISTINCT) which is available in a first runtime environment (i.e., Basis 757) might not be available in a second runtime environment (i.e., Basis 700). Accordingly, the SELECT DISTINCT syntax is refactored to a manual step of deleting duplicates to generate code suitable for the second runtime environments. Moreover, the tokens ',' and '@' used in the original code are not supported by the SELECT syntax of the second runtime environment and must be removed during the refactoring.

Figure 4:
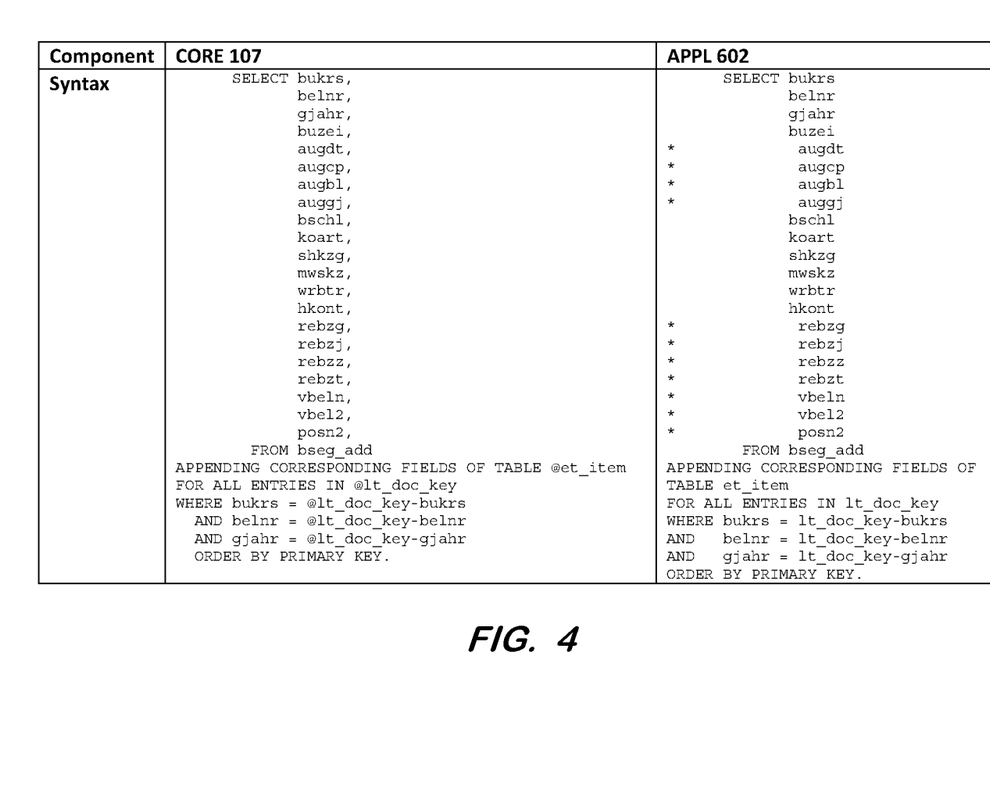
FIG. 4 illustrates cross-environment code modification according to some embodiments.

FIG. 4 illustrates a situation in which a data structure accessed by the code is different in the different runtime environments. In particular, database table BSEG_ADD includes several more fields in the first runtime environment (i.e., Core 107) than in the second runtime environment (i.e., Appl 602). For use in the second runtime environment, these unavailable fields are commented out of the code as shown.

Figure 5:
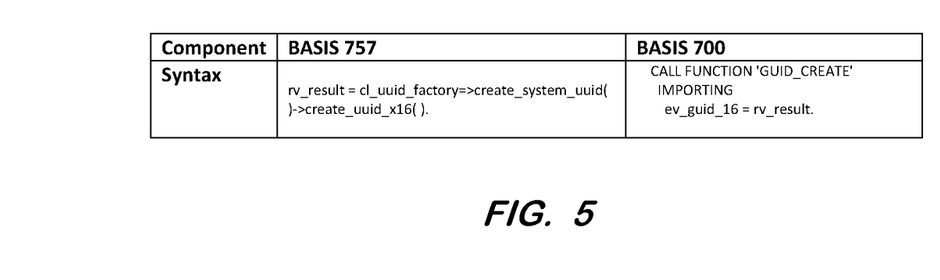
FIG. 5 illustrates cross-environment code modification according to some embodiments.

A service available in the first runtime environment might be unavailable in a second runtime environment. FIG. 5 reflects the availability of service cl_uuid_factory in runtime environment Basis 757. This service is unavailable in runtime environment Basis 700. To modify the code of FIG. 5 for use in runtime environment Basis 700, the call to service cl_uuid_factory is replaced with a call to alternative function GUID_CREATE and corresponding syntax needed to replicate the same functionality.

Figure 6:
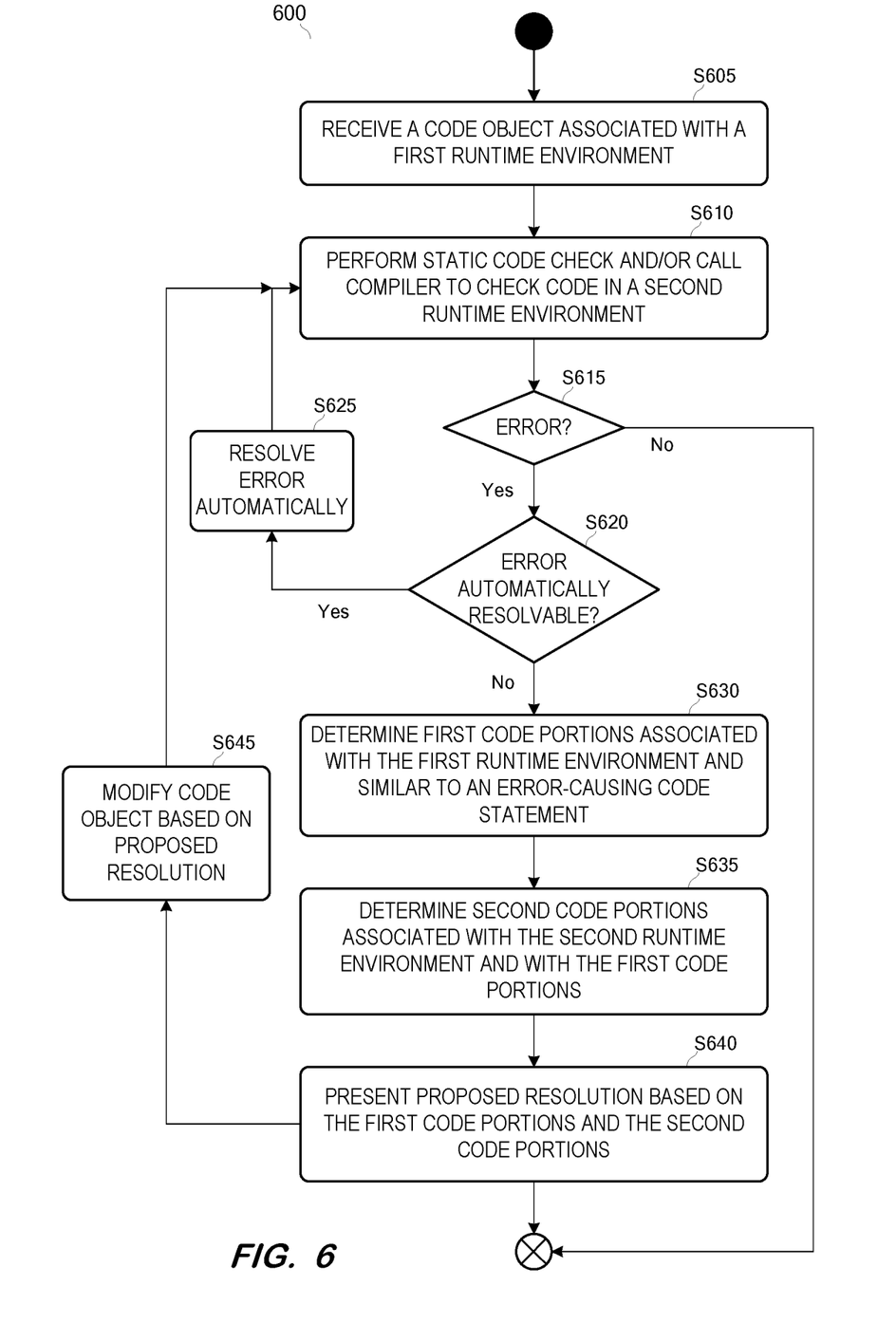
FIG. 6 is a flow diagram of a process to modify code for a given runtime environment according to some embodiments.

FIG. 6 comprises a flow diagram of process 600 to modify code for a given runtime environment according to some embodiments. Process 600 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S605, a code object associated with a first runtime environment is received at a system implementing a second runtime environment. The code object may comprise all or a portion of an application, for example, written in any programming language. According to some embodiments, the code object is copied from a first system implementing the first runtime environment using known tools.

The code is checked at S610 with respect to the second runtime environment. The check may include compilation of the code using a compiler in the second runtime environment. The check at S610 may also or alternatively include calling an external rule-based code checking service. At S615, it is determined whether the check identified any errors. If not, process 600 terminates. If an error was identified, flow proceeds to S620.

It is determined at S620 whether a first one of the identified errors is automatically resolvable. The determination at S620 may utilize a knowledgebase including a table such as table 700 of FIG. 7. Table 700 includes data which facilitates determination of whether an error identified at S610 is resolvable automatically (e.g., via execution of resolving code). The determination is based on error-related data returned from the code check at S610.

Figure 7:
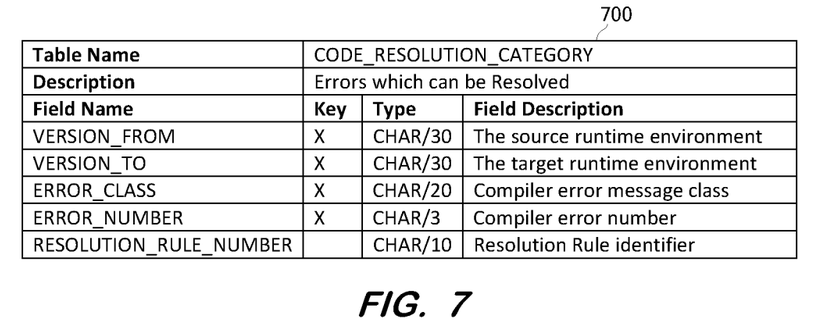
FIG. 7 is a tabular representation of a portion of a cross-environment code modification knowledge base according to some embodiments.

For example, table 700 assumes that a compiler used in S610 returns an error class and an error number associated with the determined error. In some embodiments, the code check returns data which is converted to an error class and an error number by an intermediate component. S620 may comprise generating a key consisting of an identifier of the first runtime environment (i.e., the source runtime environment), an identifier of the second runtime environment (i.e., the target runtime environment), the error class and the error number, and querying table 700 using the key. If the query returns a row, it is determined at S620 that the error is automatically resolvable and flow proceeds to S625.

Figure 8:
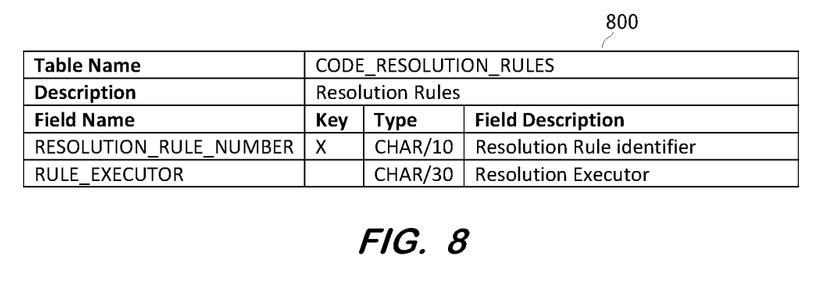
FIG. 8 is a tabular representation of a portion of a cross-environment code modification knowledge base according to some embodiments.

The error is resolved automatically at S625. Automatic resolution may comprise modifying the received code object by executing a particular function. In some embodiments, the returned row of table 700 includes a resolution rule number. This number is used as a key to identify a row of table 800. The identified row includes an identifier of an executor, which is executable code for modifying the received code to resolve a corresponding error. Accordingly, tables 700 and 800 may be used to identify pre-existing executable code for modifying code to resolve an error based on a source runtime environment, a target runtime environment, an error class and an error number.

Embodiments may include several types of error resolving-executors. With reference to FIGS. 3 and 4, a generally-applicable executor may remove occurrences of ',' or '@' when a SELECT clause is detected and a service-mapping executor may map a service to an equivalent service in the target runtime environment. Other executors may handle specific errors.

Flow proceeds from S620 to S630 if it is determined that the error is not automatically resolvable (e.g., due to the lack of a corresponding row in table 700 or the lack of a corresponding row in table 800). At S630, first code portions associated with the first runtime environment and similar to a code statement which caused the error are identified from a code repository. Second code portions associated with the first code portions and the second runtime environment are then determined at S635 from the code repository. Next, at S640, a proposed resolution of the error is presented to an operator based on the first code portions and the second code portions.

The proposed resolution may simply comprise a display of the first code portions and the second code portions. For example, showing a class associated with the first runtime environment and including the error-related code statement and an identically- or similarly-named class associated with the second runtime environment to an operator may render clear a resolution to the error. The received code object may be modified based on the proposed resolution at S645. Flow may return to S610 from S645 and proceed as described above until no errors are determined at S615.

Figure 9:
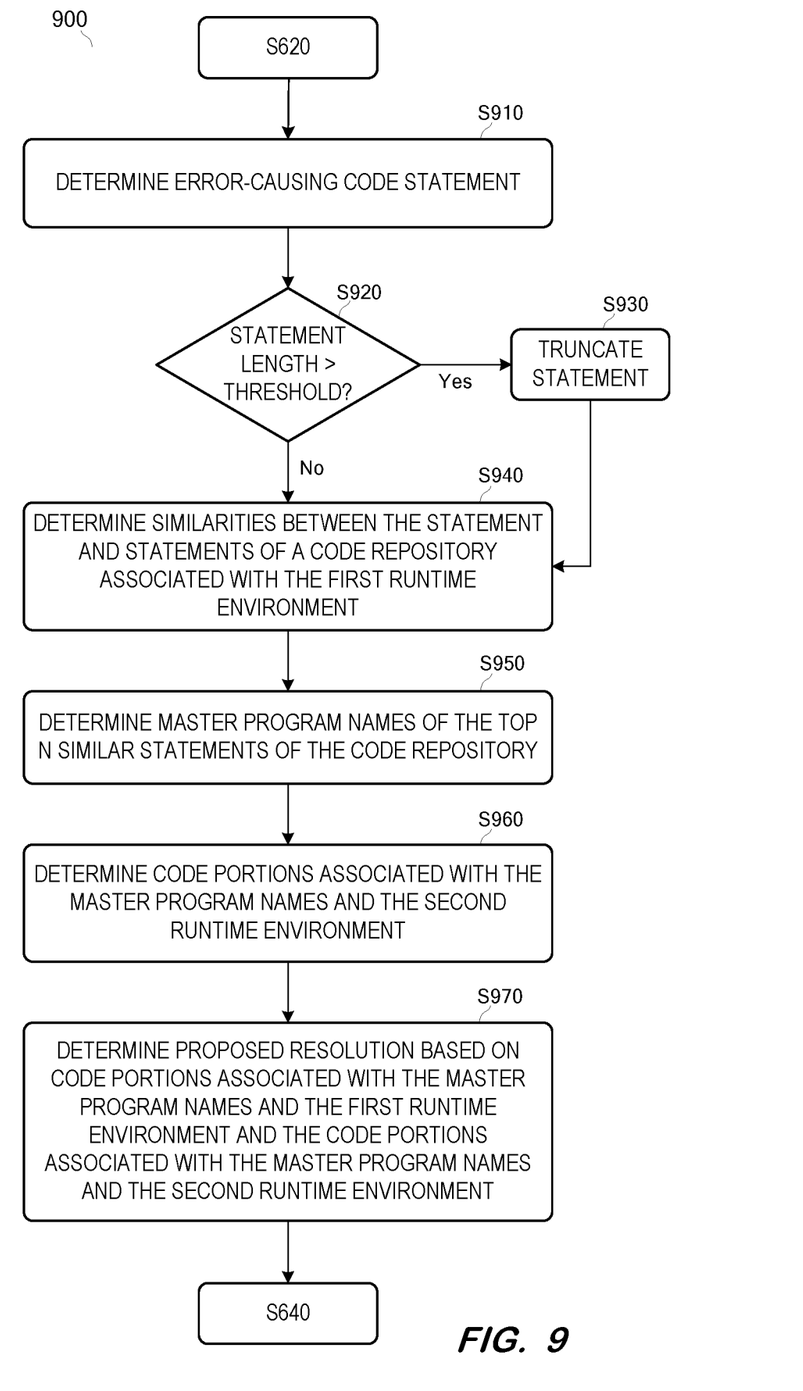
FIG. 9 is a flow diagram of a process to determine a proposed resolution based on a problematic code statement according to some embodiments.

FIG. 9 shows a flow diagram of process 900 according to some embodiments. Process 900 may comprise an implementation of S630 and S635 of process 600. Process 900 therefore commences once it is determined that an identified error is not automatically resolvable. At S910, a code statement of the code object which caused the error is determined. A compiler typically indicates a code statement corresponding to a detected error, and S910 may therefore comprise determination of the compiler-indicated code statement.

WHERE AND associated with the first runtime environment and a repository-stored code statement SELECT DISTINCT*FROM t001 INTO TABLE rt_result associated with a second runtime environment:

---

Jaccard similarity =
len ({ SELECT DISTINCT bukrs FROM bseg INTO TABLE rt_result WHERE AND } AND { SELECT DISTINCT * FROM t001 INTO TABLE rt_result } ) / len ({ SELECT DISTINCT bukrs FROM bseg INTO TABLE rt_result WHERE AND } OR { SELECT DISTINCT * FROM t001 INTO TABLE rt_result } ) =
len { SELECT DISTINCT FROM INTO TABLE rt_result } / len{ SELECT DISTINCT bukrs * FROM bseg t001 INTO TABLE rt_result WHERE AND } = 6 / 12 = 50%.

---

Next, it is determined whether the length of the identified code statement is greater than a threshold. The threshold may differ for different programming languages. In some embodiments, the threshold is 60 characters. Flow proceeds to S930 to truncate the statement to less than the threshold number of characters. Truncation to less than the threshold number of characters may be desirable to reduce complexity of the subsequent steps of process 900.

According to some embodiments, different words are weighted differently in the similarity determination. The weights may be tuned differently for different programming languages. For example, programming language key words may be weighted twice as much as other words. In such a case, the above example becomes the following:

---

Weighted Jaccard similarity =
len ({ SELECTx2 DISTINCTx2 bukrs FROMx2 bseg INTOx2 TABLEx2 rt_result WHEREx2 ANDx2 } AND { SELECTx2 DISTINCTx2 * FROMx2 t001 INTOx2 TABLEx2 rt_result } ) / len ({ SELECTx2 DISTINCTx2 bukrs FROMx2 bseg INTOx2 TABLEx2 rt_result WHEREx2 ANDx2 } OR { SELECTx2 DISTINCTx2 * FROMx2 t001 INTOx2 TABLEx2 rt_result } ) =
len { SELECTx2 DISTINCTx2 FROMx2 INTOx2 TABLEx2 rt_result } / len{ SELECTx2 DISTINCTx2 bukrs * FROMx2 bseg t001 INTOx2 TABLEx2 rt_result WHEREx2 ANDx2 } = 11 / 19 = 57.9%.

---

According to some embodiments, S930 includes extracting key words from the statement and then adding non-key words until the threshold number of characters is exceeded. Given the statement:

---

```
SELECT DISTINCT bukrs,
        belnr,
        gjahr,
        augbl,
        auggj
    FROM bseg
    INTO TABLE @rt_result
    WHERE bukrs = @is_doc_key-bukrs
        AND augbl = @is_doc_key-belnr
        AND auggj = @is_doc_key-gjahr,
```

--- the extracted key words are SELECT DISTINCT FROM INTO TABLE WHERE AND AND, Duplicate key words are removed, resulting in SELECT DISTINCT FROM INTO TABLE WHERE AND. Since the length of the resulting clause is 42 characters, non-key words are added in order of their distance from an identified key word. Accordingly, "bukrs", "bseg" and "rt_result" are added, at which point the number of characters (i.e., 63) has exceeded the threshold. The statement resulting from S930 is therefore SELECT bukrs DISTINCT FROM bukrs INTO TABLE rt_result WHERE AND.

Flow continues from S930 (with the truncated statement) or from S920 (with the non-truncated statement) to S940. At S940, a code repository is accessed to determine similarities between the statement and statements of the code repository associated with the first (i.e., source) runtime environment. The determined similarities may be calculated as Jaccard similarities, but embodiments are not limited thereto.

For example, assuming the code statement SELECT bukrs DISTINCT FROM bukrs INTO TABLE rt_result Once the similarities are determined, the top N most-similar statements associated with the second runtime environment are identified at S950. Also at S950, the names of the master programs (e.g., classes) which include the top N most-similar statements are identified from the code repository. Code portions associated with the second runtime environment and with similar or identically-named master programs are determined at S960.

A proposed resolution of the error is determined at S970 based on the code portions associated with the master program names and the first runtime environment and the code portions associated with the master program names and the second runtime environment. As mentioned above, determination of the respective code portions as described may facilitate the understanding how the function of an error-related statement can be implemented in the second runtime environment in an error-free manner.

Figure 10:
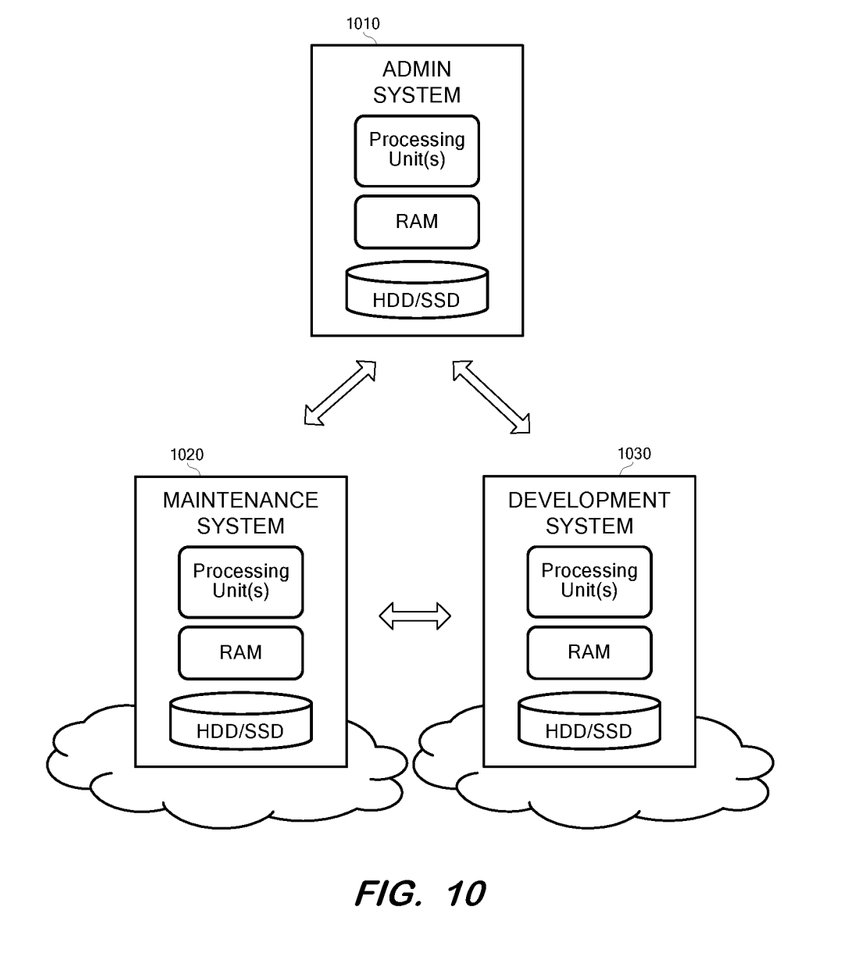
FIG. 10 is a diagram of a cloud-based implementation according to some embodiments.

FIG. 10 is a diagram of a cloud-based implementation according to some embodiments. Administrator system 1010 may comprise a local computing system operated by an operator to instruct copying and modification of code from a first runtime environment of maintenance system 1020 to a second runtime environment of development system 1030. Each of systems 1020 and 1030 may comprise cloud-based resources residing in one or more public clouds providing self-service and immediate provisioning, autoscaling, security, compliance and identity management features. Systems 1020 and 1030 may comprise servers or virtual machines of respective Kubernetes clusters, but embodiments are not limited thereto.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable recording media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system associated with a target runtime environment, the system comprising:
   a memory storing processor-executable program code; and
   at least one processing unit to execute the processor-executable program code to cause the system to:
      receive, at a target runtime environment from a first system implementing a source runtime environment, source program code associated with the source runtime environment, the source runtime environment being different than the target runtime environment;
      determine, by a compiler executing in the target runtime environment on the source program code, an error in the source program code;
      determine, by the compiler, a source code statement of the source program code corresponding to the determined error;
      determine a similarity between the source code statement and each of a plurality of code statements associated with the source runtime environment stored in a code repository associated with the source runtime environment, the determining of the similarities being based on a weight assigned to words of the source code statement with key words being weighted greater than non-key words of the of the source code statement;
      determine, based on the determined similarities, one of the plurality of code statements that is similar to the source code statement;
      determine, from the code depository, a first class name of a first code portion of the source program code that includes the determined one of the plurality of code statements;
      determine, from the code depository, a second code portion of program code associated with the target runtime environment and having the first class name;
      present a proposed resolution of the error in the source program code based on the first code portion and the second code portion, the proposed resolution including a display of the first class name associated with the source runtime environment, the first class name associated with
      the target runtime environment, and the source code statement associated with the error, and
      execute resolution code determined based on the proposed resolution, the execution of the resolution code modifies the source program code for execution in the target runtime environment.

2. A system according to claim 1, the at least one processing unit to execute the processor-executable program code to cause the system to:
   determine a second error in the source program code;
   determine resolution code based on an class name associated with the second error, the source runtime environment and the target runtime environment; and
   execute the resolution code to modify the second program code.

3. A system according to claim 1, wherein determination of the similarities comprises determination of a Jaccard similarity between the source code statement and each of the plurality of code statements associated with the source runtime environment.

4. A system according to claim 3, wherein determination of the similarities comprises truncating the source code statement to delete non-key words of the source code statement and determination of the similarities based on the truncated source code statement.

5. A system according to claim 1, wherein determination of the similarities comprises truncating the source code statement to delete non-key words of the source code statement and determination of the similarities based on the truncated source code statement.

6. A method for execution in a target runtime environment comprising:
   receiving, at a target runtime environment from a first system implementing a source runtime environment, source program code associated with the source runtime environment, the source runtime environment being different than the target runtime environment;
   determining, by a compiler executing in the target runtime environment on the source program code, an error in source program code;
   determining, by the compiler, a source code statement of the source program code corresponding to the determined error;
   determining a similarity between the source code statement and each of a plurality of code statements stored in a code repository and associated with the source runtime environment stored in a code repository associated with the source runtime environment, the determining of the similarities being based on a weight assigned to words of the source code statement with key words being weighted greater than non-key words of the of the source code statement;
   determining, based on the determined similarities, one of the plurality of code statements that is most similar to the source code statement;
   determining, from the code depository, a first class name of a first code portion of the source program code that includes the determined one of the plurality of code statements;
   determining, from the code depository, a second code portion of program code associated with the target runtime environment and having the first class name;
   presenting a proposed resolution of the error in the source program code based on the first code portion and the second code portion, the proposed resolution including a display of the first class name associated with the source runtime environment, the first class name associated with the target runtime environment, and the source code statement associated with the error, and executing resolution code determined based on the proposed resolution, the execution of the resolution code modifying the source program code for execution in the target runtime environment.

7. A method according to claim 6, further comprising:
determining a second error in the source program code;
determining resolution code based on an class name associated with the second error, the source runtime environment and the target runtime environment; and
executing the resolution code to modify the second program code.

8. A method according to claim 6, wherein determining the similarities comprises determination of a Jaccard similarity between the source code statement and each of the plurality of code statements associated with the source runtime environment.

9. A method according to claim 8, wherein determining the similarities comprises truncating the source code statement to delete non-key words of the source code statement and determining the similarities based on the truncated source code statement.

10. A method according to claim 6, wherein determining the similarities comprises truncating the source code statement to delete non-key words of the source code statement and determining the similarities based on the truncated source code statement.

11. A non-transitory computer-readable recording medium storing processor-executable program code, the program code executable by a target runtime environment of a computing system to:
receive, at a target runtime environment from a first system implementing a source runtime environment, source program code associated with the source runtime environment, the source runtime environment being different than the target runtime environment;
determine, by a compiler executing in the target runtime environment on the source program code, an error in source program code associated with a source runtime environment;
determine, by the compiler, a source code statement of the source program code corresponding to the determined error,
determine a similarity between the source code statement and each of a plurality of code statements stored in a code repository and associated with the source runtime environment stored in a code repository associated with the source runtime environment, the determining of the similarities being based on a weight assigned to words of the source code statement with key words being weighted greater than non-key words of the of the source code statement;
determine, based on the determined similarities, one of the plurality of code statements that is similar to the source code statement;
determine, from the code depository, a first class name of a first code portion of the source program code that includes the determined one of the plurality of code statements;
determine, from the code depository, a second code portion of program code associated with the target runtime environment and having the first class name;
determine a proposed resolution of the error in the source program code based on the first code portion and the second code portion, the proposed resolution including a display of the first class name associated with the source runtime environment, the first class name associated with the target runtime environment, and the source code statement associated with the error;
present the proposed resolution including a display of the first class name associated with the source runtime environment, the first class name associated with the target runtime environment, and the source code statement associated with the error; and
execute resolution code determined based on the proposed resolution, the execution of the resolution code modifies the source program code for execution in the target runtime environment.

12. A medium according to claim 11, the program code executable by a computing system to:
determine a second error in the source program code;
determine resolution code based on an class name associated with the second error, the source runtime environment and the target runtime environment; and
execute the resolution code to modify the second program code.

13. A medium according to claim 11, wherein determination of the similarities comprises determination of a Jaccard similarity between the source code statement and each of the plurality of code statements associated with the source runtime environment.

14. A medium according to claim 13, wherein determination of the similarities comprises truncation of the source code statement to delete non-key words of the source code statement and determination of the similarities based on the truncated source code statement.

15. A medium according to claim 11, wherein determination of the similarities comprises truncation of the source code statement to delete non-key words of the source code statement and determination of the similarities based on the truncated source code statement.

* * * * *